United States Patent Office 3,157,711
Patented Nov. 17, 1964

3,157,711
SUPPORTED COBALT CATALYSTS AND THEIR USE
Darrell W. Walker and Edward L. Czenkusch, Bartlesville, Okla., assignors to Phillips Petroleum Company, a corporation of Delaware
No Drawing. Filed Sept. 22, 1961, Ser. No. 139,846
11 Claims. (Cl. 260—683.9)

This invention relates to a catalyst formed by reacting supported biscyclopentadienyl cobalt with water vapor and to hydrogenation of unsaturated hydrocarbons in contact with the resulting catalyst. A specific aspect of the invention relates to a method of preparing such a catalyst.

Biscyclopentadienyl metal compounds have become commercially available and have been designated "sandwich" compounds because of their peculiar type of metal to carbon bonding. We have discovered that the reaction product of biscyclopentadienyl cobalt and water, when prepared in a specific manner on certain supports, forms an active catalyst for the hydrogenation of unsaturated hydrocarbons.

Accordingly, it is an object of the invention to provide a novel catalyst containing the supported reaction product of biscyclopentadienyl cobalt and water vapor. Another object is to provide a method of preparing an active supported catalyst containing this reaction product which is active for the hydrogenation of unsaturated hydrocarbons. A further object is to provide a process for hydrogenating unsaturated hydrocarbons with this novel catalyst. Other objects of the invention will become apparent to one skilled in the art upon consideration of the accompanying disclosure.

We have found that biscyclopentadienyl cobalt deposited on porous supports and treated in accordance with the procedures outlined hereinafter, forms an active catalyst for the hydrogenation of unsaturated hydrocarbons. The catalyst consists essentially of a minor portion of the cobalt compound and a major portion of a porous support such as silica-alumina. The supports which are effective include silica, alumina, titania, zirconia, thoria, boria, and mixtures thereof.

In the practice of this invention the catalyst preparation is begun by distributing the biscyclopentadienyl cobalt on a solid support such as silica-alumina. This may be accomplished by a dry mixing operation. For example, the organometal may be intimately and satisfactorily blended with a solid support by ball milling the components in a ball mill for a period of about 2 to 30 hours or more.

Alternatively, the composite material may be prepared by impregnating the solid support by means of a solution of the organometal in a non-aqueous solvent. Subsequent evaporation of the solvent then leaves an intimate blend of organometal and support.

Solvents which are liquids at ambient temperatures and which are sufficiently volatile to facilitate removal by evaporation are generally preferred for this use when using the impregnation. Examples of suitable non-polar solvents include the alkanes such as hexane, octane; cycloalkanes such as cyclopentane, cyclohexane; aromatics such as benzene, toluene; and many other liquids such as diethyl ether, carbon tetrachloride, and the like.

Conveniently, the solution contains sufficient biscyclopentadienyl cobalt compound to give upon admixture with the porous support, a composite containing from about 0.01 to 20 and, preferably, from about 0.05 to 10 weight percent of the organometal compound. To assure uniform impregnation, the amount of solvent is at least sufficient to saturate the solid, i.e., to completely wet the solid and fill the porous structure. Generally, the solutions contain from about 0.05 to 25 weight percent of the organometal compound.

The contact between the support and the metal compound can be effected in any convenient manner. Generally, particles of the support are dispersed in a solution of the metal compound. The temperature is conveniently the ambient temperature and is not critical. Contact times from a few seconds to several hours are adequate. The catalyst is then dried, for example, by heating at temperatures below 150° F. under reduced pressure.

The solid supports which are employed in the preparation of the catalyst, as described above, are porous solids of the acidic type, such as silica, silica-alumina, alumina, titania, boria, zirconia and thoria. Such supports are available as commercial products. It is preferred that the support consist of particles which pass thru a U.S. Mesh 10 sieve and, more desirably, thru a U.S. Mesh No. 100 sieve.

Prior to contact with the organometal compound, the solid support is pretreated so as to remove free water by heating at temperatures in the range of 800 to 2000° F., preferably 1000 to 1500° F., usually for a period of 0.5 to 48 hrs. in air. In some cases the solid can be heated serially with more than one gas. For example, the solid may be heated in air, then in nitrogen, then in hydrogen or carbon monoxide. After this pretreatment, the solid support is cooled and stored in a dry atmosphere. Subsequently, the support is impregnated with the cyclopentadienyl cobalt compound as described above.

After the organometal-support composite has been prepared, the composite is then reacted with an amount of water vapor which is up to equimolar with the amount of the organometal being contacted. The reaction occurs with great rapidity and is completed in a few seconds at ambient temperatures.

A preferred treating agent is moist air, but any inert gas containing water vapor is satisfactory as the treating agent for activating the supported organocobalt compound. Evidence of satisfactory preparation of the reaction product is the significant change of color. The yellow-brown powder turns to a definite green when reaction occurs. A convenient method of preparation of the reaction product is to expose the organometallic impregnated solid to a stream of moist air only until the point at which the solid assumes a green color.

Following this reaction step, as well as during preceding and other subsequent handling, precautions are taken to exclude materials which might destroy or adversely affect the catalytic properties of the composite catalyst. Generally, the catalyst and its components are handled in an inert atmosphere such as that provided by a blanket of dry nitrogen.

These catalysts may be used to hydrogenate unsaturated hydrocarbons such as ethylene, propylene, butenes, pentenes, cyclopentene, cyclohexene, butadiene, etc. to their corresponding saturated or more nearly saturated counterparts. In many cases the catalysts of this invention are useful for hydrogenation of an olefin-containing hydrocarbon stream, such as a refinery stream obtained by the fractionation of crude oil, or by fractionation of a catalytically or thermally cracked refinery product. The hydrogenation of such products provides fuels of enhanced value. Such hydrogenated fuels are valuable as jet fuels. Although this process is applied to any hydrogenatable unsaturated hydrocarbon, it is particularly applicable to unsaturated $C_2$ to $C_{12}$ acyclic and alicyclic hydrocarbons.

The hydrogenation of olefins and olefin containing mixtures by contact with hydrogen or hydrogen-rich gas streams in the presence of these new catalysts can be effected, either continuously or batchwise. The hydrogenation may be effected either in the gas phase or in the liquid phase in the temperature range of 120–750, preferably 210–575° F., at pressures of 0–5000 p.s.i.g. Liquid phase reactions can be effected, if desired, in the presence of a diluent under conditions of temperature and pressure required to maintain the reactants in solution. Suitable diluents are inert saturated compounds which may be readily separated from the reaction products. Examples are pentanes, octanes, decanes, cyclopentane, cyclohexane, methylcyclohexane, etc. The hydrogen may be added to the reaction either continuously or intermittently to maintain the desired pressure. Reaction can be evidenced by noting the rate at which hydrogen gas is consumed and also as indicated by thermal changes which are reflected by decrease in the heat required to maintain the reaction temperature. In a batch type run the catalyst concentration will generally range from 0.02–20 weight percent of the reaction mixture, excluding diluent, if any. In a fixed catalyst bed reaction, the vapor space velocity will generally range from 50 to 10,000 (volumes vapor/volume catalyst/hour).

The contact times in the reaction zones may vary over wide limits to achieve the desired degree of hydrogenation. In many applications complete hydrogenation is attained by contact times of the order of 0.1 minute to 3 hours.

At the end of the reaction period which effects partial or complete hydrogenation, the reaction mixture may be fractionated to recover the unreacted constitutents and separate the catalyst for recycle in the process. Any convenient means may be used for this separation although fractionation by distillation is commonly preferred.

In order to illustrate the invention, the following specific examples are presented. It is to be understood that these examples are merely illustrative and are not to be interpreted in such a manner as to unnecessarily limit the scope of the invention.

*Example I*

Commercial 87:13 silica-alumina having an average particle size of about 70 microns was activated by heating 20 hrs. at 1000° F. in air, 0.5 hr. in nitrogen, and 2 hrs. in hydrogen. A 10.25 g. quantity of the preactivated solid was dispersed in 30 cc. of a clear red toluene solution of 0.631 g. of biscyclopentadienyl cobalt at about 70° F. This operation was carried out in a water-free system under a blanket of nitrogen gas. The toluene solvent was then removed from the slurry by vacuum distillation at no higher than room temperature. A yellow-brown, free-flowing powder was obtained. The powder was subjected to momentary exposure to moist air at which time the powder turned to a green color.

A 2.71 g. portion of the above prepared catalyst was charged into a previously warmed and nitrogen purged 1.4 liter stainless steel agitated reactor together with 227 g. cyclohexane and about 134 g. of butene-1. The reactor was sealed and maintained for 1.75 hr. at 280° F. and at pressures up to 300 p.s.i.g. by a demand flow of hydrogen gas. The hydrogen gas was treated before entering the reactor with palladium-alumina and alumina to remove oxygen and moisture. At the completion of the reaction the contents of the reactor were transferred to a distillation column which fractionally separated 134 g. of $C_4$ hydrocarbon of which 99% was found converted to n-butane as determined by vapor phase chromatography.

*Example II*

In this test the hydrogenation of butene-1 was attempted in the presence of biscyclopentadienyl cobalt.

A 2.16 g. quantity of the preactivated silica-alumina prepared in Example I was charged into a previously warmed and nitrogen purged stainless steel agitated 1.4 liter reactor together with a 157 cc. solution of cyclohexane containing 0.23 g. of biscyclopentadienyl cobalt. The slurry was agitated for several minutes and the silica-alumina support was permitted to absorb the organometal compound within the reactor at 165° F. About 105 g. butene-1 and 227 g. of cyclohexane were then added and the reactor sealed. This operation was carried out in a water free system under a blanket of nitrogen gas. The reactor was then maintained for 1 hour at 280° F. and at pressures up to 375 p.s.i.g. by a demand flow of hydrogen gas. The hydrogen gas was deoxygenated and dried before entering the reactor. At the completion of the reaction the contents of the reactor were transferred to a distillation column which fractionally separated 105 g. of $C_4$ hydrocarbons. Vapor phase chromatography yielded the following analysis of the mixture:

| | Percent |
|---|---|
| n-Butane | 0.8 |
| Butene-1 | 73.8 |
| Trans-butene-2 | 12.6 |
| Cis-butene-2 | 12.8 |

Certain modifications of the invention will become apparent to those skilled in the art and the illustrative details disclosed are not to be construed as imposing unnecessary limitations on the invention.

We claim:

1. The process of preparing a catalyst comprising forming an intimate mixture of biscyclopentadienyl cobalt and a dry, porous, particulate support selected from the group consisting of silica, alumina, titania, zirconia, thoria, boria, and mixtures thereof in a water-free inert ambient, the resulting composite having a yellow-brown color; thereafter reacting the resulting composite with a gas comprising water vapor only until the color of said composite turns green; and thereafter maintaining the composite in a moisture-free ambient inert to said composite.

2. The process of claim 1 wherein said intimate mixture is formed by impregnating said support with a water-free organic solution of biscyclopentadienyl cobalt and evaporating the organic solvent from said support; and said gas is moist air.

3. The process of claim 1 wherein said intimate mixture is formed by ball milling said support and biscyclopentadienyl cobalt for a period of at least 2 hours.

4. A catalyst comprising green biscyclopentadienyl cobalt on a porous support made by the process of claim 1 and including a major proportion of said support.

5. The catalyst of claim 4 in which the support is silica-alumina.

6. The catalyst of claim 4 wherein the concentration of biscyclopentadienyl cobalt is in the range of 0.01 to 20 weight percent of the composite.

7. The catalyst of claim 6 wherein said support is silica-alumina.

8. A process for hydrogenating a hydrogenatable unsaturated hydrocarbon which comprises contacting said hydrocarbon under hydrogenating conditions in admixture with hydrogen with a catalyst consisting essentially of an intimate mixture of a porous particulate support selected from the group consisting of silica, alumina, titania, zirconia, thoria, boria, and mixtures thereof and a minor but effective amount of the green reaction product of biscyclopentadienyl cobalt and water vapor.

9. The process of claim 8 wherein said hydrocarbon is a $C_2$ to $C_{12}$ olefin.

10. The process of claim 9 wherein said support is silica-alumina and the concentration of the cobalt compound is in the range of 0.01 to 20 weight percent of the catalyst.

11. The process of claim 8 wherein said hydrocarbon comprises a butylene, said support is silica-alumina, and the concentration of cobalt compound is in the range of 0.05–10 weight percent of the catalyst.

References Cited in the file of this patent
UNITED STATES PATENTS

| | | |
|---|---|---|
| 2,547,380 | Fleck | Apr. 3, 1951 |
| 2,999,075 | Pruett | Sept. 5, 1961 |